United States Patent
Mach et al.

(10) Patent No.: US 12,210,175 B2
(45) Date of Patent: Jan. 28, 2025

(54) ALL-OPTICAL VOLUMETRIC IMAGING VIA SPECTRAL SWEEP BY MEANS OF A TRANSMISSIVE BRAGG GRATING FEATURING A RADIALLY DEPENDENT PLANE OF DIFFRACTION

(71) Applicant: University of Central Florida Research Foundation, Inc., Orlando, FL (US)

(72) Inventors: Lam Mach, Orlando, FL (US); Ivan Divliansky, Orlando, FL (US); Leonid Glebov, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 18/676,022

(22) Filed: May 28, 2024

(65) Prior Publication Data

US 2024/0393510 A1    Nov. 28, 2024

Related U.S. Application Data

(60) Provisional application No. 63/469,116, filed on May 26, 2023.

(51) Int. Cl.
*G02B 5/18* (2006.01)
*G02B 5/32* (2006.01)
*G03H 1/02* (2006.01)

(52) U.S. Cl.
CPC ............. *G02B 5/1857* (2013.01); *G02B 5/32* (2013.01); *G03H 1/0248* (2013.01); *G02B 2005/1804* (2013.01)

(58) Field of Classification Search
CPC ................. G02B 5/1857; G02B 5/32; G02B 2005/1804; G03H 1/0248
See application file for complete search history.

(56) References Cited

U.S. PATENT DOCUMENTS

| | | | | |
|---|---|---|---|---|
| 7,700,270 | B1* | 4/2010 | Glebov | G03H 1/02 372/100 |
| 2002/0045104 | A1* | 4/2002 | Efimov | G03H 1/0248 430/1 |
| 2016/0116656 | A1* | 4/2016 | Glebov | G03H 1/04 359/3 |
| 2023/0050198 | A1* | 2/2023 | McGrew | G02B 27/4205 |

OTHER PUBLICATIONS

James W. Field et al. Highly-chirped Bragg gratings for integrated silica spectrometers. vol. 28, No. 14 / Jul. 6, 2020 / Optics Express 21247. (Year: 2020).*

(Continued)

*Primary Examiner* — Collin X Beatty
(74) *Attorney, Agent, or Firm* — Suiter Swantz IP

(57) ABSTRACT

An imaging element may include volume Bragg grating (VBG) within a material, where the material has an input face, and where the VBG is formed as a periodic distribution of curved surfaces of refractive index variation with chirped periodicity in a volume of the material. The periodic distribution of curved surfaces of refractive index variation forming the VBG may be selected to image different object planes oriented parallel to the input face onto different lateral locations of a single image plane with different wavelengths via the Bragg diffraction.

31 Claims, 16 Drawing Sheets

(56) References Cited

OTHER PUBLICATIONS

Shima Nezhadbadeh et al. Chirped-grating spectrometer-on-a-chip. Optics Express vol. 28, Issue 17, pp. 24501-24510 (2020). (Year: 2020).*

Glebov, Leonid, et al. "Volume-chirped Bragg Gratings: Monolithic Components for Stretching and Compression of Ultrashort Laser Pulses." SPIE., by (CREOL) and Optigrate Corp, Feb. 2014, www.spiedigitallibrary.org/journals/optical-engineer (Year: 2014).

Igor V. Ciapurin, et al., "Modeling of phase volume diffractive gratings, part 1: transmitting sinusoidal uniform gratings," Optical Engineering 45 (2006) 015802, 1-9.

Igor V. Ciapurin, et al., "Modeling of phase volume diffractive gratings, part 2: reflecting sinusoidal uniform gratings, Bragg mirrors," Optical Engineering 51 (2012) 058001, 1-10.

Duocastella et al., "Fast Inertia-Free Volumetric Light-Sheet Microscope," ACS Photonics, Jun. 22, 2017, 9 pages.

Kopman et al., "Photo-thermo-refractive glass with sensitivity to visible and near IR radiation," Optical Materials Express, vol. 6, No. 12, Dec. 1, 2016, 11 pages.

Kozawa et al., "Wavefront engineered light needle microscopy for axially resolved rapid volumetric imaging," Biomedical Optics Express, vol. 13, No. 3, Mar. 1, 2022, 16 pages.

Li et al., "Fast, volumetric live-cell imaging using high-resolution light-field microscopy," Biomedical Optics Express, vol. 10, No. 1, Jan. 1, 2019, 21 pages.

Mach et al., "Intracavity spatial mode conversion by holographic phase masks," Optics Express, vol. 30, No. 4, Feb. 14, 2022, 11 pages.

Olarte et al., "Decoupled illumination detection in light sheet microscopy for fast volumetric imaging," Optica, vol. 2, No. 8, Aug. 2015, 4 pages.

Sinha et al., "vol. holographic imaging in transmission geometry," Applied Optics, vol. 43, No. 7, Mar. 1, 2004, 19 pages.

Takanezawa et al., "Wide field light-sheet microscopy with lens-axicon controlled two-photon Bessel beam illumination," Nature Communications, May 2021, 15 pages.

Vogt, "Volumetric imaging with confocal light field microscopy," Nature Methods, vol. 17, Oct. 2020, 1 page.

Yoon et al., "Sparse decomposition light-field microscopy for high speed imaging of neuronal activity," Optica, vol. 7, No. 10, Oct. 2020, 12 pages.

Zhang et al., "Imaging volumetric dynamics at high speed in mouse and zebrafish brain with confocal light field microscopy," Nature Biotechnology, vol. 39, Jan. 2021, 15 pages.

Zhou et al., "Review of light field technologies," Springer, Visual Computing for Industry, Biomedicine, and Art, 2021, 13 pages.

* cited by examiner

ALL-OPTICAL VOLUMETRIC IMAGING VIA SPECTRAL SWEEP BY MEANS OF A TRANSMISSIVE BRAGG GRATING FEATURING A RADIALLY DEPENDENT PLANE OF DIFFRACTION

CROSS-REFERENCE TO RELATED APPLICATION

The present application claims the benefit under 35 U.S.C. § 119(e) of U.S. Provisional Application Ser. No. 63/469,116, filed May 26, 2023, entitled ALL-OPTICAL VOLUMETRIC IMAGING VIA SPECTRAL SWEEP BY MEANS OF A TRANSMISSIVE BRAGG GRATING FEATURING A RADIALLY DEPENDENT PLANE OF DIFFRACTION, naming Lam Mach, Ivan Divliansky, and Leonid Glebov as inventors, which is incorporated herein by reference in the entirety.

TECHNICAL FIELD

The present disclosure relates generally to volumetric imaging and, more particularly, to volumetric imaging with a transmissive Bragg grating featuring a radially dependent plane of diffraction.

BACKGROUND

A conventional imaging system, typically found in a table-top microscope, captures the two-dimensional cross-section of a three-dimensional space at a specific distance along its optical axis corresponding to a direction of illumination. Geometric relations between the object and image planes with respect to the imaging device (e.g., a lens or microscope objective) can be expressed in the simplified form of:

$$\frac{1}{f} = \frac{1}{L_{obj}} + \frac{1}{L_{img}}, \quad (1)$$

which is commonly referred to as the thin-lens approximation. In Equation (1), f is the imaging element's focal length, $L_{obj}$ is a distance between an object plane and the imaging element, and $L_{img}$ is a distance between an image plan and the imaging element. The ratio of $L_{obj}$ and $L_{img}$ dictates the magnification factor M of an imaging system:

$$M = \frac{L_{img}}{L_{obj}}. \quad (2)$$

Since the recorded cross-section spans a two-dimensional plane orthogonal to the optical axis, a conventional imaging system is inherently orthographic. Such a system possesses a narrow depth of field (DOF) corresponding to areas along the optical axis before and after the object plane within which spatial features are perfectly projected onto the image plane. The DOF of an imaging system is dependent on its numerical aperture NA and magnification ratio M:

$$DOF = \frac{n\lambda}{NA^2} + \epsilon \frac{n}{M \cdot NA}, \quad (3)$$

where n is the refractive index of the imaging element at the illumination wavelength $\lambda$, while $\epsilon$ denotes the spatial resolution of a detector.

Due to the restricted DOF of such a platform, its operation in a conventional table-top microscope is limited to the imaging of thin samples. For a thicker sample, however, a stack of two-dimensional cross-sections recorded at discrete points along its thickness is needed to fully reconstruct the object of interest, which may be referred to as volumetric imaging via optical sectioning. The processing time of such an approach depends on the sample thickness, as well as the physical separation between consecutive cross-sections along the illumination direction (i.e., the longitudinal resolution). In this configuration, the entire volume of a specimen may be characterized by physically translating either the sample or imaging device along the optical axis. However, the speed at which images are acquired is inherently slow, which hampers the use of such a technique to live or light-sensitive specimens.

Various approaches have been developed to address this issue, which can be separated into three groups: (1) volume holographic imaging (VHI) based on the principles of Bragg diffraction, (2) imaging with a structured light sheet, and (3) three-dimensional deconvolution of light field scattered from the sample via synthetic focusing. However, these methods suffer from either a relatively large or complex optical footprint, limited NA, a limited number of cross-sectional images that may be practically generated, or high computational processing resources. There is therefore a need to develop systems and methods that address the above deficiencies.

SUMMARY

In embodiments, the techniques described herein relate to an imaging element including a volume Bragg grating (VBG) within a material, where the material has an input face, where the VBG is formed as a periodic distribution of curved surfaces of refractive index variation with chirped periodicity in a volume of the material, where the periodic distribution of curved surfaces of refractive index variation forming the VBG is selected to image different object planes oriented parallel to the input face onto different lateral locations of a single image plane with different wavelengths via Bragg diffraction.

In embodiments, the techniques described herein relate to an imaging element, where the chirped periodicity includes transverse chirp.

In embodiments, the techniques described herein relate to an imaging element, where the material includes at least one of a glass, a crystal, a polymer, or a sol-gel.

In embodiments, the techniques described herein relate to an imaging element, where the VBG provides a dioptric power with an optical axis tilted with respect to the input face.

In embodiments, the techniques described herein relate to an imaging element, where the VBG is a transmissive VBG.

In embodiments, the techniques described herein relate to an imaging element, where the VBG is a reflective VBG.

In embodiments, the techniques described herein relate to an imaging system including a tunable light source configured to illuminate a sample with illumination, where a wavelength of the illumination is tunable; a volume Bragg grating (VBG) within a material, where the material has an input face, where the VBG is formed as a periodic distribution of curved surfaces of refractive index variation with chirped periodicity in a volume of the material, where the periodic distribution of curved surfaces of refractive index variation forming the VBG is selected to image different object planes oriented parallel to the input face onto different lateral locations of an image plane with different wavelengths via Bragg diffraction; and a detector located at the image plane; where the tunable light source is configured to sequentially provide two or more values of the wavelength to sequentially image two or more of the object planes in the sample onto the different lateral locations of the detector.

In embodiments, the techniques described herein relate to an imaging system, further including a controller including one or more processors configured to execute program instructions causing the one or more processors to receive data from the detector associated with the sequential imaging of two or more of the object planes in the sample onto the different lateral locations of the detector; and generate a three-dimensional dataset associated with the sample based on the data from the detector.

In embodiments, the techniques described herein relate to an imaging system, where the three-dimensional dataset includes two or more images.

In embodiments, the techniques described herein relate to an imaging system, where the chirped periodicity includes transverse chirp.

In embodiments, the techniques described herein relate to an imaging system, where the material includes at least one of a glass, a crystal, a polymer, or a sol-gel.

In embodiments, the techniques described herein relate to an imaging system, where the VBG provides a dioptric power with an optical axis tilted with respect to the input face.

In embodiments, the techniques described herein relate to an imaging system, where the tunable light source provides narrowband source light as the illumination, where the wavelength of the narrowband source light is tunable.

In embodiments, the techniques described herein relate to an imaging system, where the tunable light source provides broadband source light, where the imaging system further includes a tunable narrowband spectral filter, where the illumination is formed from a portion of the broadband source light filtered by the tunable narrowband spectral filter.

In embodiments, the techniques described herein relate to an imaging system, where the VBG is a transmissive VBG.

In embodiments, the techniques described herein relate to an imaging system, where the VBG is a reflective VBG.

In embodiments, the techniques described herein relate to a method for fabricating an imaging element, including splitting light from a coherent light source into a first beam propagating along a first path and a second beam propagating along a second path, where the second path includes a spherical lens; interfering the first beam and the second beam in a material to generate an interference pattern associated with a volume Bragg grating (VBG) within the material; and generating the VBG within the material based on interference of the first beam and the second beam, where the VBG is formed as a periodic distribution of curved surfaces of refractive index variation with chirped periodicity in a volume of the material, where the periodic distribution of curved surfaces of refractive index variation forming the VBG is selected to image different object planes oriented parallel to an input face of the material onto different lateral locations of a single image plane with different wavelengths via Bragg diffraction.

In embodiments, the techniques described herein relate to a method, where the material is a photosensitive material, where generating the volume Bragg grating (VBG) within the material based on interference of the first beam and the second beam includes interfering the first beam and the second beam in the material to induce the periodic distribution of curved surfaces of refractive index variation with chirped periodicity in the volume of the material.

In embodiments, the techniques described herein relate to a method, where the material is a photosensitive material, where generating the volume Bragg grating (VBG) within the material based on interference of the first beam and the second beam includes interfering the first beam and the second beam in the material to induce a chemical change in the material; and heating the material to induce the periodic distribution of curved surfaces of refractive index variation with chirped periodicity in the volume of the material.

In embodiments, the techniques described herein relate to a method, where the chirped periodicity includes transverse chirp.

In embodiments, the techniques described herein relate to a method, where the material includes at least one of a glass, a crystal, a polymer, or a sol-gel.

In embodiments, the techniques described herein relate to a method, where the VBG provides a dioptric power with an optical axis tilted with respect to the input face.

In embodiments, the techniques described herein relate to a method, where the VBG is a transmissive VBG.

In embodiments, the techniques described herein relate to a method, where the VBG is a reflective VBG.

In embodiments, the techniques described herein relate to a method for volumetric imaging, including aligning a detector with volumetric Bragg grating (VBG) for imaging of a sample, where the VBG is formed as a periodic distribution of curved surfaces of refractive index variation with chirped periodicity in a volume of a material, where the periodic distribution of curved surfaces of refractive index variation forming the VBG is selected to image different object planes in the sample oriented parallel to an input face of the material onto different lateral locations of a single image plane with different wavelengths via Bragg diffraction, where the detector is located at the single image plane; and sequentially illuminating the sample with two or more wavelength values to sequentially image two or more of the object planes in the sample onto the different lateral locations of the detector.

In embodiments, the techniques described herein relate to a method, further including receiving data from the detector associated with the sequential imaging of the two or more of the object planes in the sample onto the different lateral locations of the detector; and generating a three-dimensional dataset associated with the sample based on the data from the detector.

In embodiments, the techniques described herein relate to a method, where the three-dimensional dataset includes two or more images.

In embodiments, the techniques described herein relate to a method, where the chirped periodicity includes transverse chirp.

In embodiments, the techniques described herein relate to a method, where the VBG provides a dioptric power with an optical axis tilted with respect to the input face.

In embodiments, the techniques described herein relate to a method, where the VBG is a transmissive VBG.

In embodiments, the techniques described herein relate to a method, where the VBG is a reflective VBG.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

DETAILED DESCRIPTION

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods providing volumetric imaging utilizing an imaging volume Bragg grating (VBG) having a three-dimensional refractive index distribution with transverse chirp (e.g., having a period that varies spatially along at least one dimension transverse to incident light and/or a grating vector) and curved surfaces of equal refractive index designed to simultaneously diffract and focus light satisfying a Bragg condition along a direction different than an incident direction. Put another way, an imaging VBG as described herein may have a radially-varying diffraction plane. An imaging VBG as disclosed herein may thus operate as an off-axis imaging element.

For example, conditions for Bragg diffraction may be satisfied for a particular wavelength of the imaging VBG such that diffracted light is directed along a particular diffraction direction. The curved shape of the diffraction region may further provide a dioptric power such that the VBG operates in a manner analogous to an off-axis mirror for light satisfying the Bragg condition for diffraction. As a result, the imaging VBG may generate an image of an object plane at an image plane, where the image plane is tilted with respect to the object plane.

An imaging VBG as disclosed herein may additionally provide wavelength-dependent imaging, which may be exploited to provide volumetric imaging of a sample. In particular, the three-dimensional refractive index distribution of the imaging VBG may provide that different wavelengths provide images of different object planes (e.g., planes of different depth in a sample) on a common image plane, albeit at different lateral locations of the image plane based on different diffraction angles of the different wavelengths by the imaging VBG. In this configuration, volumetric imaging of a sample may be provided by sweeping an illumination wavelength and capturing associated images of different object planes in the sample. Such a configuration may beneficially provide high-speed passive imaging with stationary components utilizing spectrally-swept illumination (e.g., without requiring moving parts).

Referring now to FIGS. 1A-8, systems and methods providing volumetric imaging utilizing an imaging volume Bragg grating (VBG) are described in greater detail, in accordance with one or more embodiments of the present disclosure.

Figure 1A:
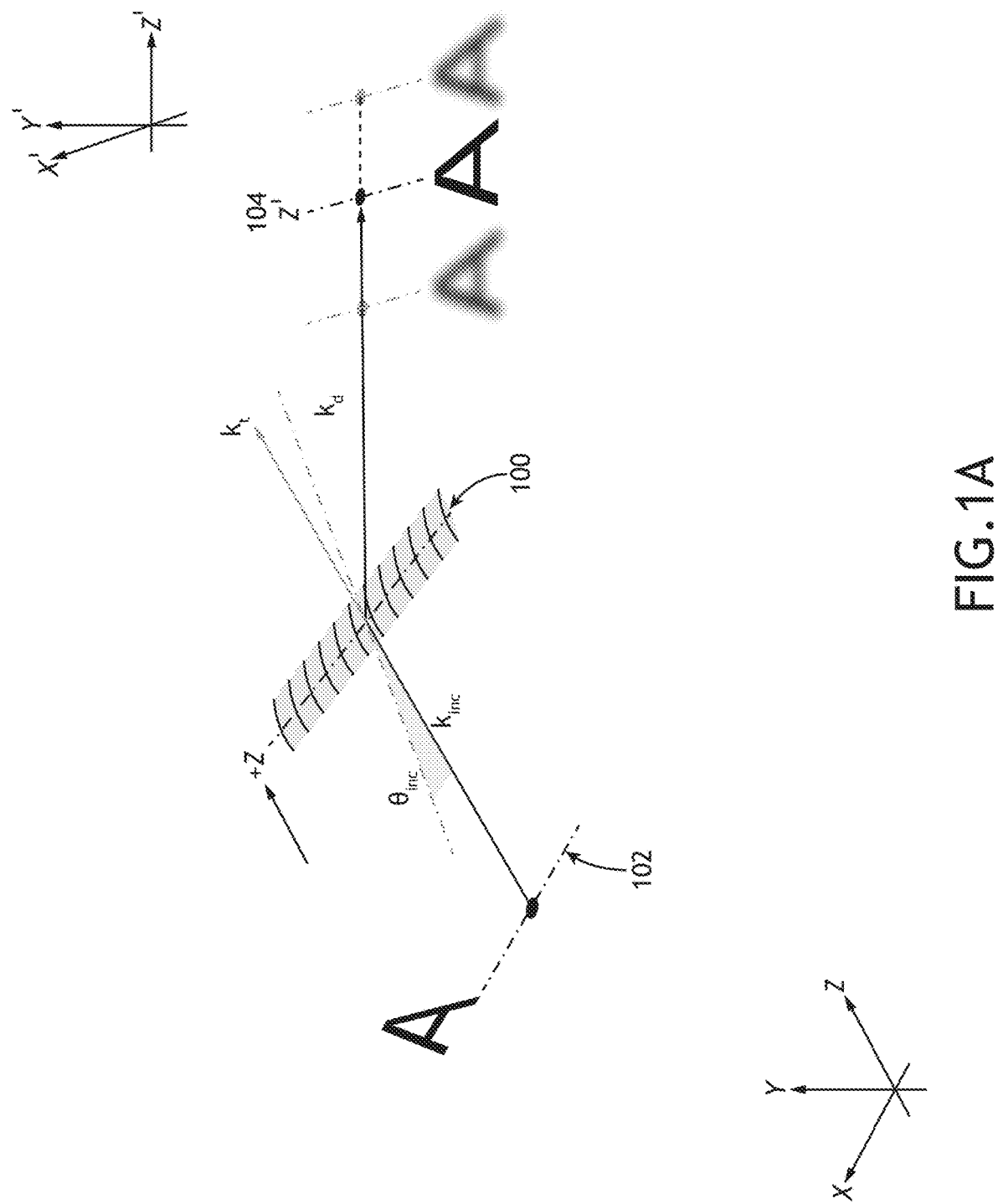
FIG. 1A illustrates a simplified schematic of the operation of an imaging VBG, in accordance with one or more embodiments of the present disclosure.

FIG. 1A illustrates a simplified schematic of the operation of an imaging VBG 100, in accordance with one or more embodiments of the present disclosure.

In some embodiments, an imaging VBG 100 is formed as a periodic distribution of curved surfaces of refractive index variation with chirped periodicity in a volume of the material (e.g., transversely chirped periodicity). Put another way, the imaging VBG 100 may have curved diffraction surfaces designed to simultaneously induce Bragg diffraction and provide dioptric power (e.g., for focusing, imaging, or the like) for Bragg-diffracted light. In this way, the imaging VBG 100 may generate an image of an object plane 102 at an image plane 104 based on light that satisfied conditions for Bragg diffraction, where the image plane 104 is tilted with respect to the object plane 102. For example, the object plane 102 may correspond to an XY plane, whereas the image plane 104 may correspond to an X'Y' plane.

For example, FIG. 1A depicts imaging with an imaging VBG 100 based on light satisfying conditions for Bragg diffraction. In this configuration, incident light characterized by a wavevector $k_{inc}$ along a Z direction that satisfies conditions for Bragg diffraction is diffracted along a diffraction direction characterized by a wavevector $k_d$ along a Z' direction that is different than a transmission direction characterized by a wavevector $k_t$ along the Z direction. Further, the curved diffracting surfaces (e.g., periodic distribution of curved surfaces of constant refractive index) may operate as an imaging element such that a distribution of light at an object plane 102 (e.g., represented by the character "A") may be imaged to an image plane 104. In particular, FIG. 1A depicts the character "A" as being sharply in focus at the image plane 104 and blurred at planes on either side of the image plane 104.

Figure 1B:
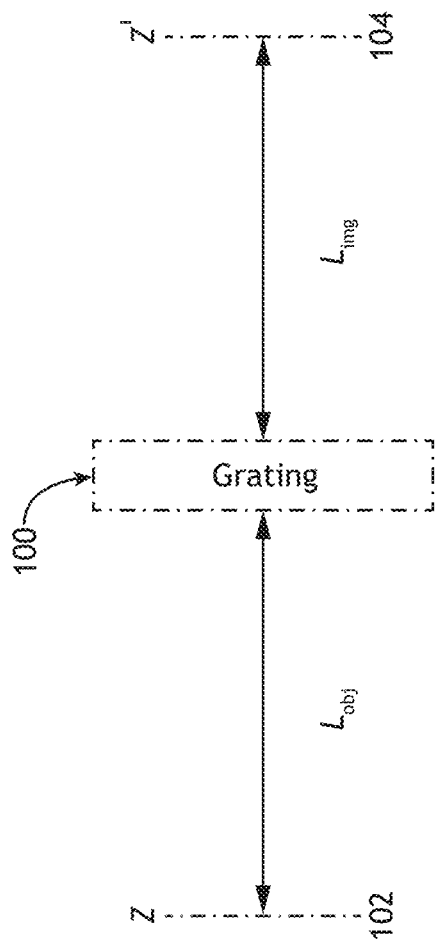
FIG. 1B illustrates a simplified schematic of the operation of an imaging VBG as an imaging element, in accordance with one or more embodiments of the present disclosure.

FIG. 1B illustrates a simplified schematic of the operation of an imaging VBG 100 as an imaging element, in accordance with one or more embodiments of the present disclosure. For example, FIG. 1B illustrates how the imaging VBG 100 is analogous to a lens that generates an image of light in an object plane 102 located at a distance of $L_{obj}$ from the imaging VBG 100 at an image plane 104 located at a distance $L_{img}$ from the imaging VBG 100. Further, the thin lens approximation in Equation (1) may also hold for the imaging VBG 100. Note that the directions of the Z and Z' directions are shown schematically in FIG. 1B along a common axis for illustrative purposes only.

Figure 2:
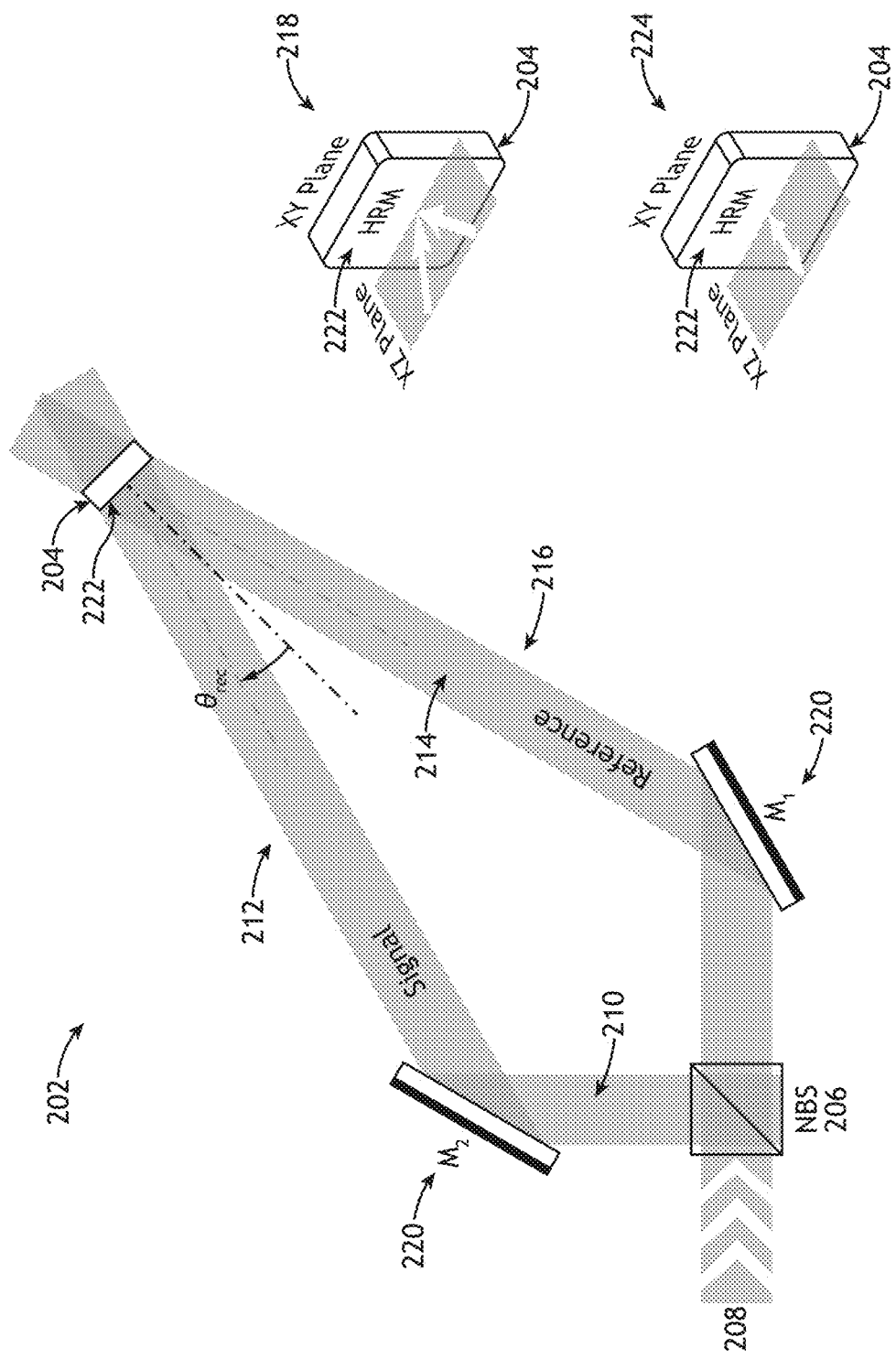
FIG. 2 illustrates an interferometer for fabricating a traditional VBG formed as a periodic distribution of planes of varying refractive index, in accordance with one or more embodiments of the present disclosure.
Figure 3:
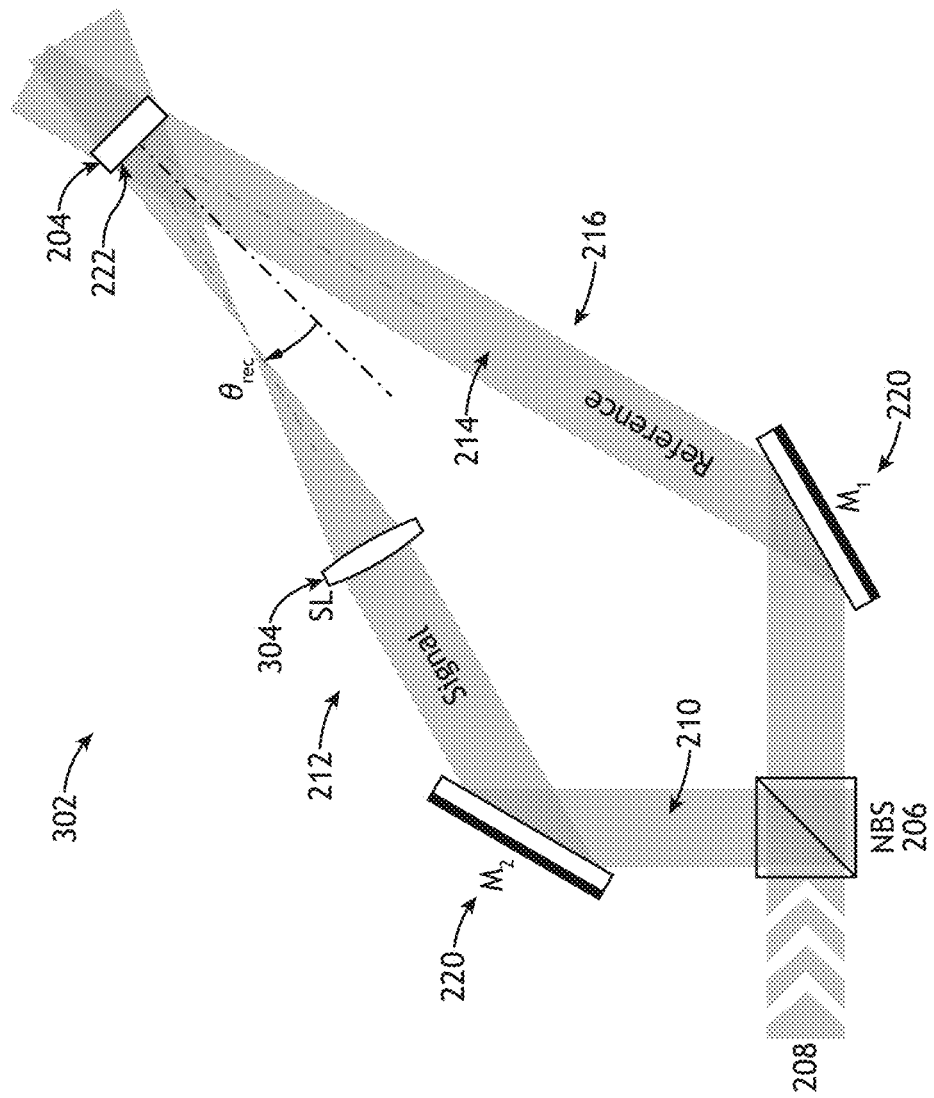
FIG. 3 illustrates an interferometer for fabricating an imaging VBG formed as a periodic distribution of curved surfaces of varying refractive index, in accordance with one or more embodiments of the present disclosure.

Referring now to FIGS. 2-3, the fabrication of an imaging VBG 100 as well as a relationship between an imaging VBG 100 and a traditional VBG are described in greater detail, in accordance with one or more embodiments of the present disclosure.

VBGs are generally described in Igor V. Ciapurin, et al., "Modeling of phase volume diffractive gratings, part 1: transmitting sinusoidal uniform gratings," Optical Engineering 45 (2006) 015802, 1-9; and Igor V. Ciapurin, et al., "Modeling of phase volume diffractive gratings, part 2: reflecting sinusoidal uniform gratings, Bragg mirrors," Optical Engineering 51 (2012) 058001, 1-10, both of which are incorporated herein by reference in their entireties. Further, transmissive VBGs (e.g., VBGs for which light satisfying a Bragg condition is diffracted as a transmitted beam) configured as transmissive phase masks are described generally in U.S. Patent Publication No. 2016/0116656 published on Apr. 28, 2016, which is incorporated herein by reference in its entirety.

A VBG may be formed as a grating structure associated within the volume of material with a periodic variation of refractive index along a grating vector direction k=

$$\frac{2\pi}{d}.$$

The material may include a photosensitive material or any other suitable material. This grating structure of a traditional VGB is typically extended in directions perpendicular to the grating vector direction. Put another way, a traditional VBG may have a constant refractive index within any plane normal to the grating vector direction, where the refractive index along the grating vector direction varies periodically. Such a traditional VBG is referred to herein as a planar VBG.

Further, a VBG may generally have any selected variation of the refractive index along the grating vector direction so long as a Bragg condition is satisfied for at least one wavelength in at least a portion of the VBG. For example, the refractive index n of a VBG may be a simple sinusoidal function with a constant (e.g., uniform) period along the grating vector direction. As another example, the refractive index n of a chirped VBG may have a variable period along the grating vector direction and may thus satisfy a Bragg condition for different wavelengths at different locations. As another example, the refractive index variation ($\delta n$) of an apodized VBG may vary along the grating vector direction.

FIG. 2 illustrates an interferometer 202 for fabricating a traditional VBG formed as a periodic distribution of planes of varying refractive index, in accordance with one or more embodiments of the present disclosure.

In some embodiments, a planar VBG is formed by placing a photosensitive material 204 in an interferometer 202 such that an interference pattern associated with a desired planar VBG is formed in the photosensitive material 204. In this way, one or more properties of the photosensitive material 204 may change in response to the incident illumination such that the interference pattern is exposed in the photosensitive material 204. As necessary, additional steps such as, but not limited to, heating the photosensitive material 204 may be performed to render the exposed interference pattern more permanent.

The photosensitive material 204 may include any photosensitive material known in the art. For example, the photosensitive material 204 may include a glass, a crystal, a polymer, a sol-gel, or the like. In some embodiments, the photosensitive material 204 includes photo-thermo-refractive (PTR) glass. For example, PTR glass may include one or more photosensitive dopants and/or one or more halogen ions. As an illustration PTR glass may include, but is not limited to, sodium aluminosilicate glass containing sodium fluoride (NaF) and potassium bromide (KBr) along with silver, cerium, tin, and/or antimony oxides. Such a material may produce various photoionized states upon exposure with ultraviolet (UV) light (typically including silver) that may further crystallize into nucleation centers (e.g., nanoclusters, crystalline phases, or the like) upon thermal treatment (e.g., heating and/or cooling). Any suitable device may be used to provide the heat treatment including, but not limited to, an oven. Further, species such as NaF, NaBr, or the like may be formed during the thermal treatment. The resulting exposed interference pattern may be patterned into the volume of the photosensitive material 204. However, it is recognized herein that various compositions of PTR glass may be developed and that the present disclosure is not limited to any particular composition or any particular thermal treatment profile.

In some embodiments, a VBG is formed in a photosensitive material 204 directly as a result of exposure with light without the need for thermal treatment.

In some embodiments, the interferometer 202 includes a beamsplitter 206 (e.g., a non-polarizing beamsplitter) to split coherent input light 208 (e.g., recording light) suitable for exposing the desired interference pattern in the photosensitive material 204 into signal light 210 in a signal arm 212 and reference light 214 in a reference arm 216. The input light 208 may have any spectral properties and intensity suitable for exposing the interference pattern in the photosensitive material 204. For example, in the case of PTR glass, the input light 208 may include UV illumination (e.g., 325 nm, or the like). Further, the input light 208 may be spatially filtered and reshaped by an optical homogenizer to yield a collimating, flat-top beam with planar wavefront. An optional beam expander might be added to achieve the intended beam-size, matching the photosensitive medium's exposed area (inset 218 in FIG. 2).

In some embodiments, the interferometer 202 further includes various optical elements (e.g., mirrors 220, or the like) to direct the signal light 210 and the reference light 214 to the photosensitive material 204 at angles necessary to produce a desired interference pattern. For example, as depicted in FIG. 2, the arms of the interferometer 202 may enter the photosensitive material 204 at an input face 222 (e.g., in an XY plane) to generate an interference pattern within the volume of the photosensitive material 204.

The optically identical signal light 210 and reference light 214 are subsequently recombined at a well-defined intersecting angle $\theta_{rec}$ to yield an interference profile with the desired modulation period (inset 224 in FIG. 2):

$$\theta_{rec} = \arcsin\left[\frac{\lambda_{uv}}{2n_{uv}\Lambda_B}\right], \quad (4)$$

matching that of the intended Bragg condition:

$$\Lambda_B = \frac{\lambda_B}{2n_B \sin\theta_B}. \quad (6)$$

Here, $\Lambda_B$ and $\theta_B$ are the Bragg period and angle, respectively. $\lambda_{uv}$ and $n_{uv}$ denote the recording wavelength and its corresponding refractive index, while $\lambda_B$ and $n_B$ are the Bragg wavelength and its respective index.

In some embodiments, a volume of the photosensitive material 204 is exposed to the generated pattern of a series of evenly spaced, alternating bright and dark bands. The interaction between the laser light and glass matrix induces a series of local chemical reactions, leading to a change in the local refractive index either directly or after an additional treatment (e.g., heating, or the like). This mechanism allows the interference pattern to be mapped directly onto the refractive-index profile of the photosensitive material 204, thereby preserving the intended modulation period. The interference of two plane waves, originating from the same coherent source, gives rise to a standing-wave intensity pattern that mimics the index profile of a fixed-period Bragg grating. Thus, such a grating represents the simplest form of a phase-only volume hologram.

FIG. 3 illustrates an interferometer 302 for fabricating an imaging VBG 100 formed as a periodic distribution of curved surfaces of varying refractive index, in accordance with one or more embodiments of the present disclosure. The interferometer 302 in FIG. 3 is substantially similar to the interferometer 202 in FIG. 2, except that the interferometer 302 includes a spherical lens 304 within the signal arm 212 to modify the signal light 210 and thus the ultimate interference pattern within the photosensitive material 204.

It is contemplated herein that the introduction of the spherical lens 304 induces two crucial changes to the interference pattern and thus the structure of the generated hologram (e.g., the imaging VBG 100) relative to a traditional VBG fabricated using the interferometer 202 in FIG. 2. First, the local Bragg period is no longer fixed, but continuously varied along a direction (x) parallel to a readout plane (e.g., the XY plane). Second, the orientation of each localized Bragg grating relative to the input face 222 is further altered, resulting in a tilted plane of diffraction. This tilt changes across an axis orthogonal to the input face 222. These modifications give rise to a laterally-chirped (e.g., transversely chirped) DOE with a vertically curved diffracting plane, which resembles a conventional off-axis mirror. The focal length the imaging VBG 100 can be estimated by the following relation:

$$f \approx f_{uv} \cdot \frac{n_B \lambda_{uv}}{n_{uv} \lambda_B} \cdot \cos\theta_B \cdot \frac{1}{1 - \frac{1}{2}\left[\frac{n_B \lambda_{uv}}{n_{uv} \lambda_B} \cdot \sin\theta_B\right]^2}, \quad (7)$$

where $f_{uv}$ is the focal distance of the spherical lens 304 used during recording.

Figure 4A:
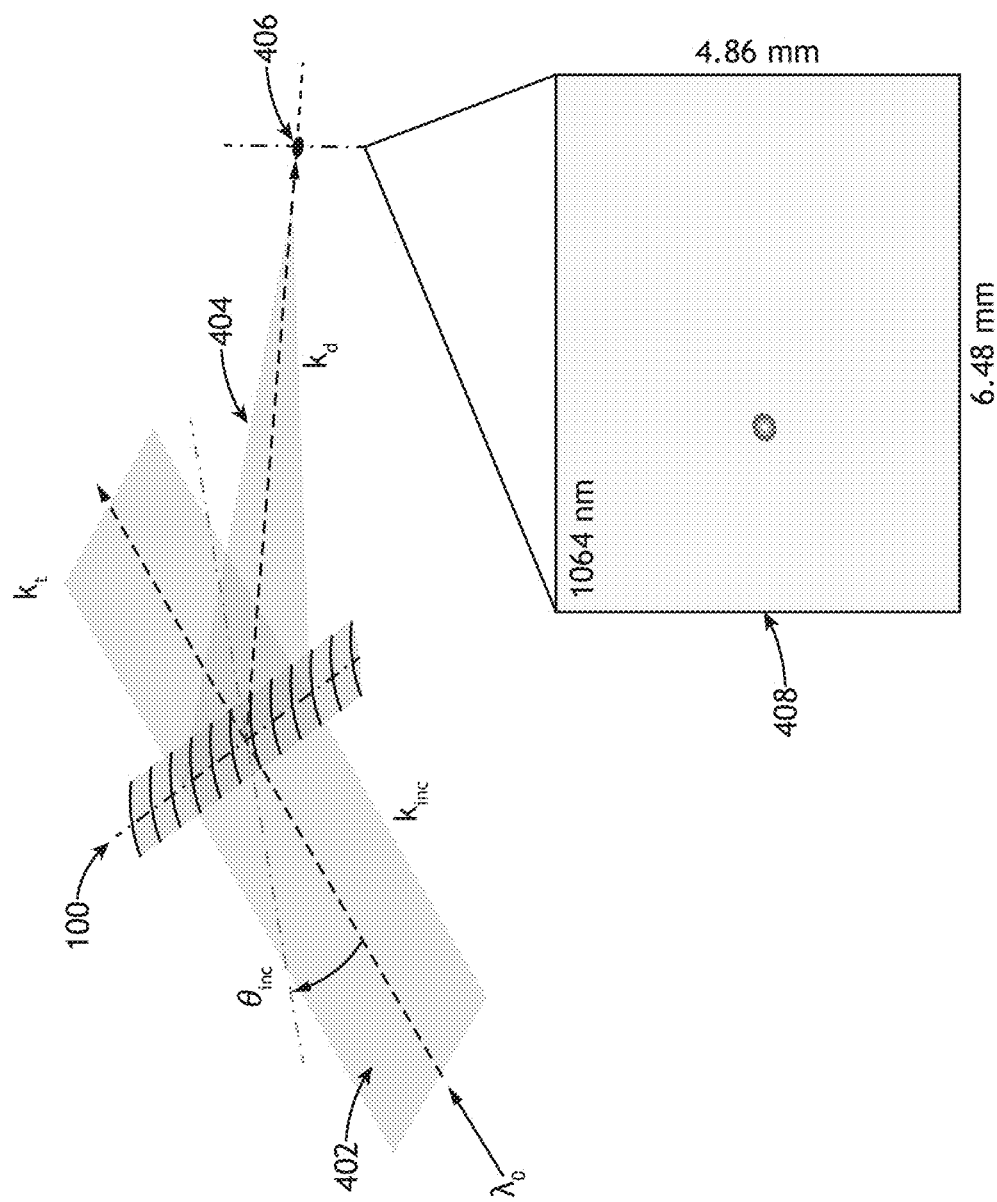
FIG. 4A illustrates a converging Bragg-diffracted beam from an imaging VBG, in accordance with one or more embodiments of the present disclosure.

An imaging VBG 100 may further provide both converging and diverging orders of diffraction that may be independently accessed. FIG. 4A illustrates a converging Bragg-diffracted beam from an imaging VBG 100, in accordance with one or more embodiments of the present disclosure. In particular, FIG. 4A depicts a collimated beam 402 incident on an imaging VBG 100 and a converging diffracted beam 404 (characterized by wavevector $k_d$) that converges to a point 406. Inset 408 illustrates a measured beam profile of a 1064 nm collimated beam 402 focused by an imaging VBG 100 at a distance of approximately 25 cm from the imaging VBG 100. It is noted that such a converging diffraction order is provided when light is incident on a concave region of the curved diffractive surfaces (e.g., curved surfaces of constant refractive index) of an imaging VBG 100.

Figure 4B:
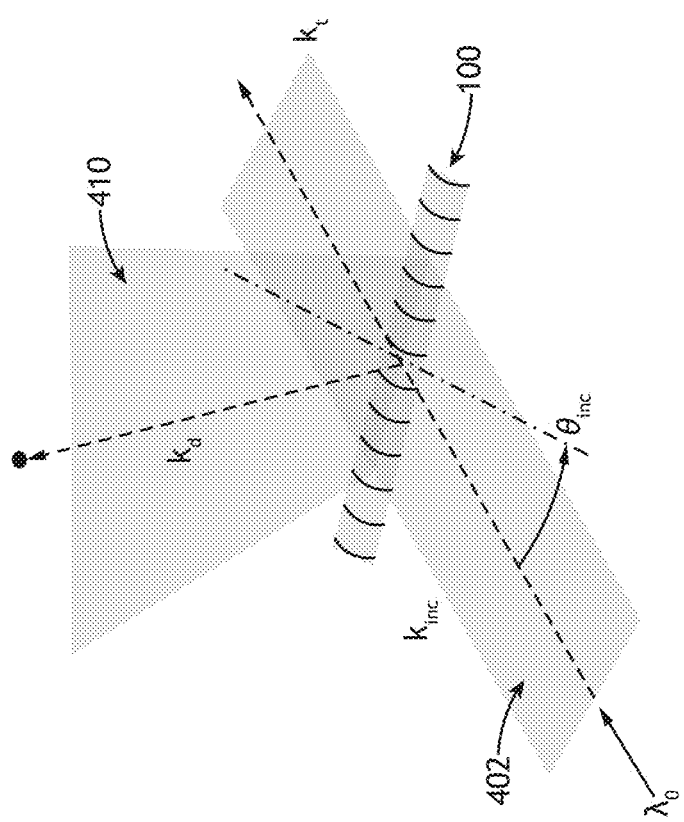
FIG. 4B illustrates a diverging Bragg-diffracted beam from an imaging VBG, in accordance with one or more embodiments of the present disclosure.

FIG. 4B illustrates a diverging Bragg-diffracted beam 410 from an imaging VBG 100, in accordance with one or more embodiments of the present disclosure. Such a diverging diffraction order is provided when light is incident on a convex region of the curved diffractive surfaces of an imaging VBG 100.

Referring now to FIGS. 5A-8, imaging with an imaging VBG 100 is described in greater detail, in accordance with one or more embodiments of the present disclosure. It is contemplated herein that an imaging VBG 100 may provide volumetric imaging of multiple object planes 102 at different depths (e.g., different locations along the Z direction in FIG. 1A) onto different lateral locations of a common image plane 104 based on a spectral sweep of illumination and/or a rotational sweep of the imaging VBG 100.

Figure 5A:
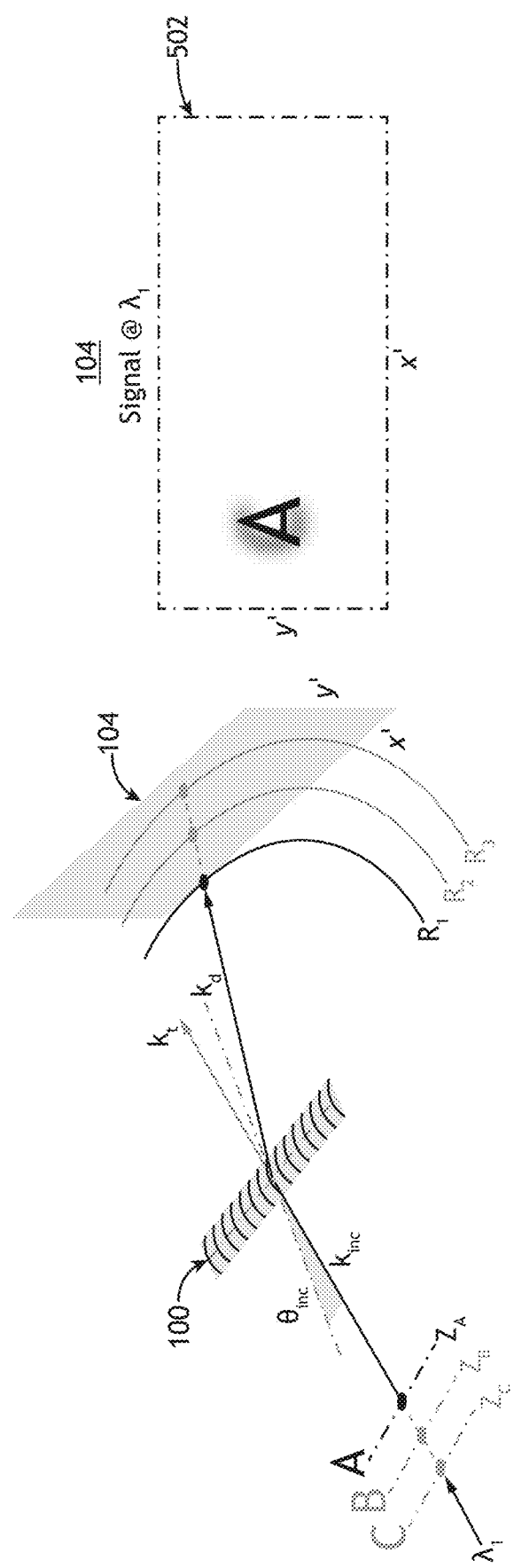
FIG. 5A illustrates imaging of an object at a selected object plane with illumination having a first wavelength by an imaging VBG oriented to provide a first incidence angle, in accordance with one or more embodiments of the present disclosure.
Figure 5B:
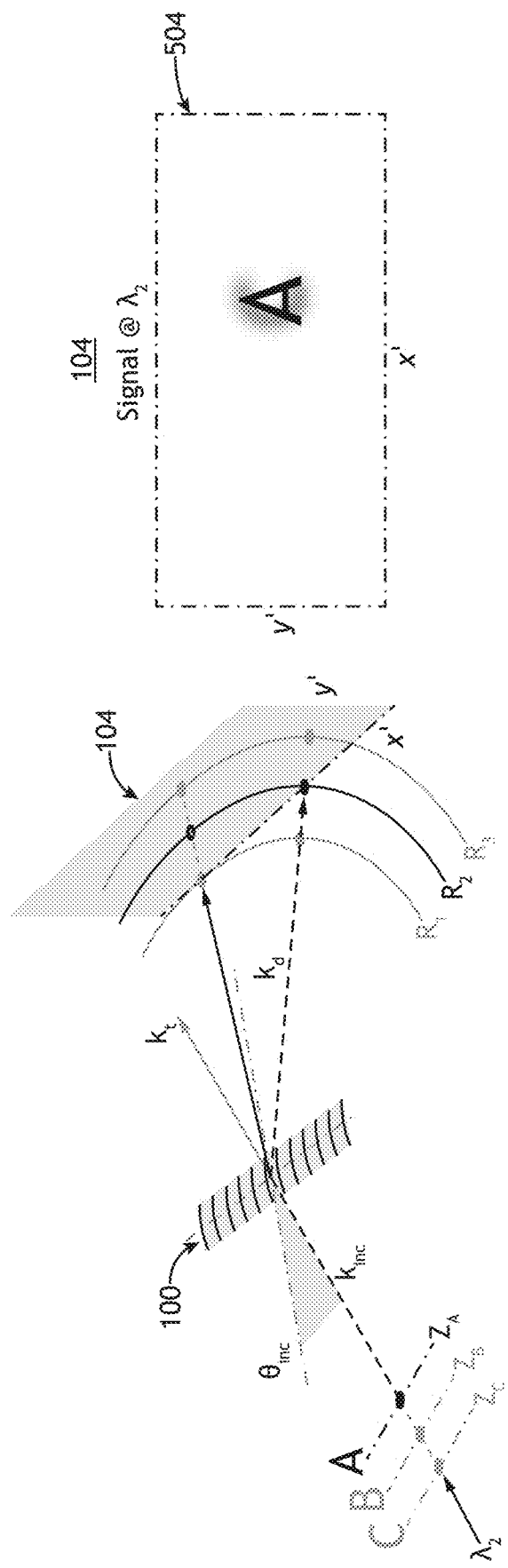
FIG. 5B illustrates imaging of the object in FIG. 5A with illumination having a second wavelength by an imaging VBG oriented to provide a second incidence angle, in accordance with one or more embodiments of the present disclosure.
Figure 5C:
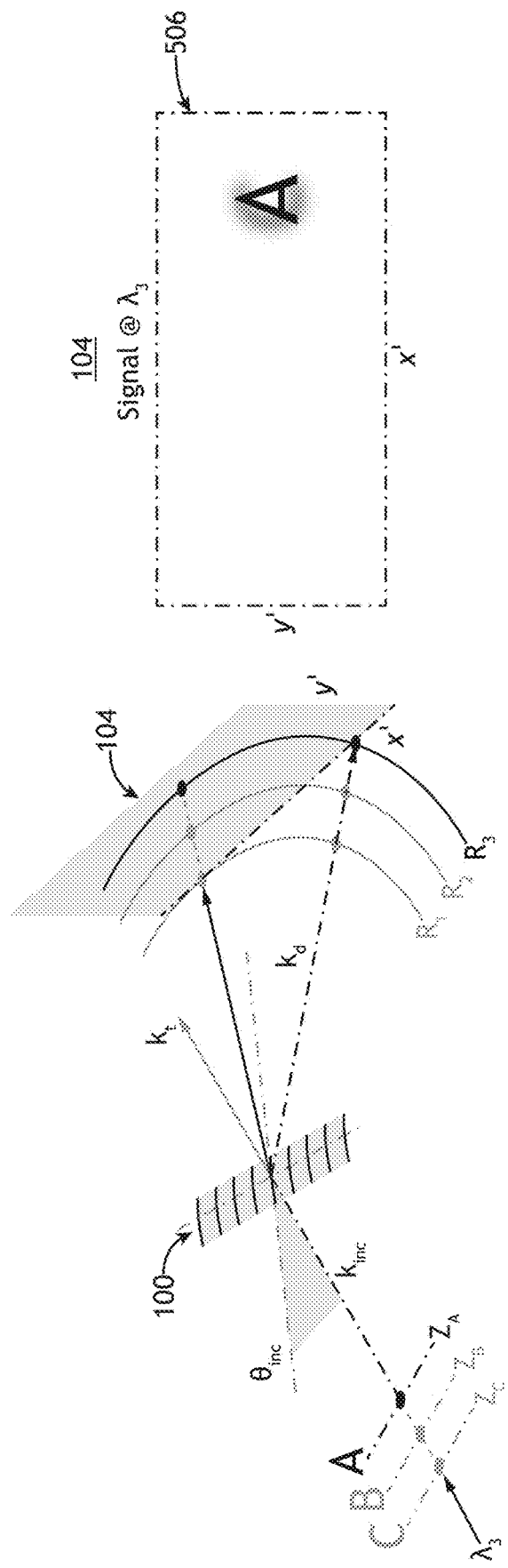
FIG. 5C illustrates imaging of the object in FIG. 5A with illumination having a third wavelength by an imaging VBG oriented to provide a second incidence angle, in accordance with one or more embodiments of the present disclosure.

FIGS. 5A-5C illustrate imaging of a particular object plane 102 ($Z_A$), here including a character "A," at different combinations of illumination wavelength and angular orientation of an imaging VBG 100.

For each wavelength within a diffraction bandwidth of an imaging VBG 100, there exists a corresponding Bragg angle that allows for the complete reconstruction of an object in a selected object plane 102. Notably, different combinations of illumination wavelength and orientation angle of an imaging VBG 100 exist that image a selected object at a selected object plane 102 to a common image plane 104. However, different combinations of the illumination wavelength and the orientation angle of the imaging VBG 100 result in different lateral positions of the image in the image plane 104. Put another way, each combination of illumination wavelength and orientation angle yields a unique radius of curvature (depicted as $R_1$ through $R_3$ in FIGS. 5A-5C) that provides a complete reconstruction of the object plane 102 at the image plane 104.

FIG. 5A illustrates imaging of an object (here, the character "A") at a selected object plane 102 ($Z_A$) with illumination having a first wavelength ($\lambda_1$) by an imaging VBG 100 oriented to provide a first incidence angle $\theta_{inc}$, in accordance with one or more embodiments of the present disclosure. Inset 502 depicts an image of the character "A" at a first lateral location on the image plane 104. FIG. 5B illustrates imaging of the object in FIG. 5A (here, the character "A") with illumination having a second wavelength ($\lambda_2$) by an imaging VBG 100 oriented to provide a second incidence angle $\theta_{inc}$, in accordance with one or more embodiments of the present disclosure. Inset 504 depicts an image of the character "A" at a second lateral location on the image plane 104. For example, the image in FIG. 5B is laterally displaced along the X' direction. FIG. 5C illustrates imaging of the object in FIG. 5A (here, the character "A") with illumination having a third wavelength ($\lambda_3$) by an imaging VBG 100 oriented to provide a second incidence angle $\theta_{inc}$, in accordance with one or more embodiments of the present disclosure. Inset 506 depicts an image of the character "A" at a third lateral location on the image plane 104.

Note that only the angle of incidence ($\theta_{inc}$) onto the imaging VBG 100 is altered during operation, while relative distances between the imaging VBG 100 and the object plane 102/image plane 104 are left untouched in this example. In all illustrated cases, the same layer of a sample (e.g., image plane 104 $Z_A$ including the character "A") is reproduced at different lateral locations of the image plane 104 for each unique pair of Bragg wavelength and angle. Further, objects at other depths (e.g., characters "B" and "C" and object planes 102 $Z_B$ and $Z_C$, respectively, are blurred at the image plane 104.

Figure 6A:
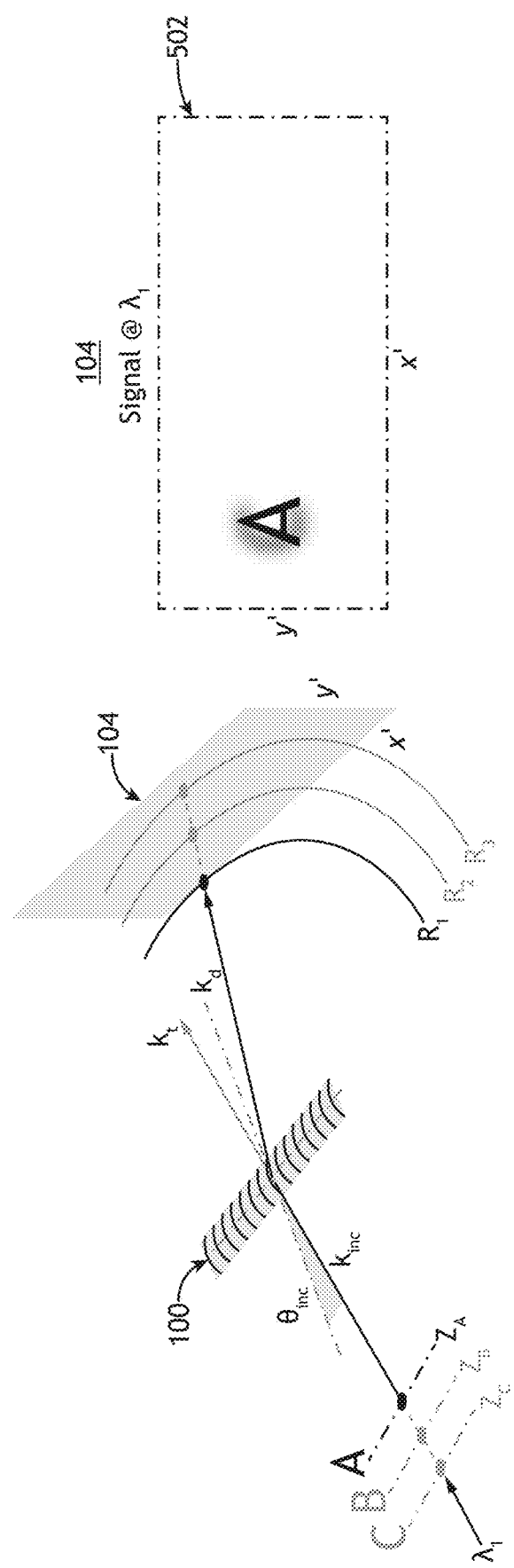
FIG. 6A illustrates imaging of a character "A" in a first object plane to a first lateral location of an image plane, in accordance with one or more embodiments of the present disclosure.
Figure 6B:
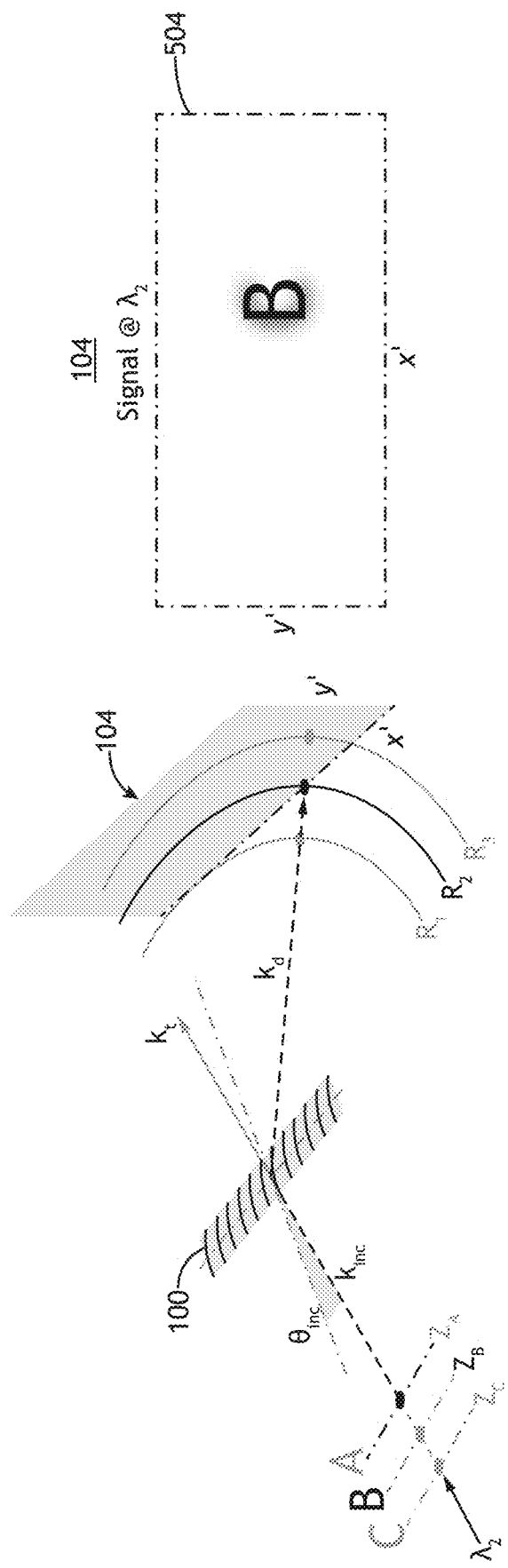
FIG. 6B illustrates imaging of a character "B" in a second object plane to a second lateral location of the image plane, in accordance with one or more embodiments of the present disclosure.
Figure 6C:
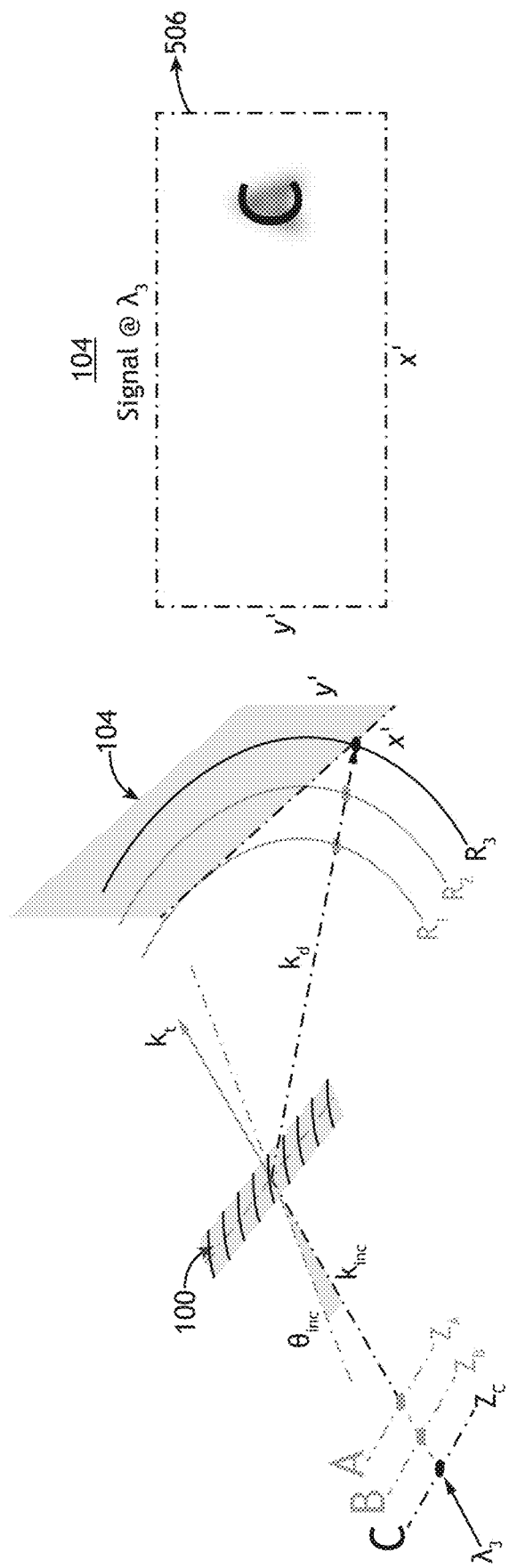
FIG. 6C illustrates imaging of a character "C" in a second object plane to a third lateral location of the image plane, in accordance with one or more embodiments of the present disclosure.

Referring now to FIGS. 6A-6C, volumetric imaging is now described, in accordance with one or more embodiments of the present disclosure.

FIGS. 6A-6C illustrate volumetric imaging at of three different object planes 102 ($Z_A$, $Z_B$, $Z_C$) a at different depths to a common image plane 104 based on a spectral sweep of illumination used for imaging. In particular, FIG. 6A illustrates imaging of a character "A" in a first object plane 102 ($Z_A$) to a first lateral location of an image plane 104 (e.g., an X'Y' plane), in accordance with one or more embodiments of the present disclosure. FIG. 6B illustrates imaging of a character "B" in a second object plane 102 ($Z_B$) to a second lateral location of the image plane 104, in accordance with one or more embodiments of the present disclosure. FIG. 6C illustrates imaging of a character "C" in a second object plane 102 ($Z_C$) to a third lateral location of the image plane 104, in accordance with one or more embodiments of the present disclosure.

In FIGS. 6A-6C, the angle of incidence ($\theta_{inc}$) onto the imaging VBG 100 remains constant and the only variation is the wavelength of the illumination. As with FIGS. 5A-5C, objects at depth other than the image plane 104 of interest in each are blurred at the image plane 104.

Based on the principles of optical sectioning, a thick object can be reconstructed from a series of thinner cross-sections. By sweeping the wavelength (e.g., color) of illumination light, distinct cross-sections of a three-dimensional sample can be sequentially characterized. The ability to reproduce different layers of a thick object onto a common image plane via spectral detuning enables the process of volumetric imaging.

The absence of external inputs during operation further makes such an approach passive. The all-optical imaging system is thus mechanically simple to maintain, whose operating speed is limited only by the spectral rate-of-change of its light source. Recent works on external cavity diode lasers and other chip-scaled photonic switches allow up to multiple gigahertz of wavelength change, tunable over tens of nanometers in bandwidth.

Figure 7:
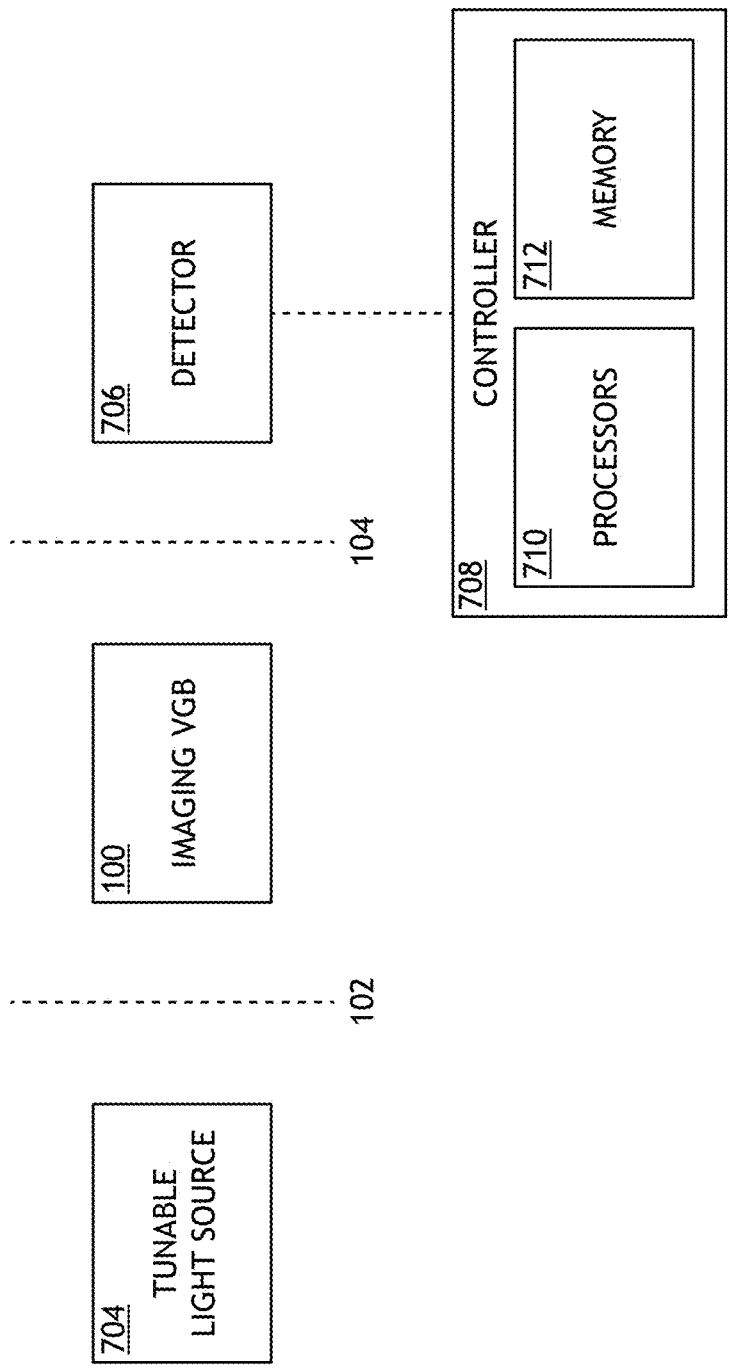
FIG. 7 illustrates a block diagram of an imaging system incorporating an imaging VBG, in accordance with one or more embodiments of the present disclosure.

FIG. 7 illustrates a block diagram of an imaging system 702 incorporating an imaging VBG 100, in accordance with one or more embodiments of the present disclosure.

In some embodiments, an imaging system 702 includes a tunable light source 704, an imaging VBG 100 (e.g., within a volume of photosensitive material 204), and a detector 706. For example, the detector 706 may be positioned at a selected distance from the imaging VBG 100 to provide an image plane 104 suitable for capturing images of one or more object planes 102 at selected locations. For example, the spatial relationships between the imaging VBG 100, the image plane 104, and any object planes 102 may be based on imaging relationships such as, but not limited to, Equation (1). In some embodiments, the image plane 104 (e.g., the detector 706) and an object plane 102 are arranged two focal lengths away from the imaging VBG 100 to form a 2f imaging system.

Further, the precise position and angles of the detector 706 (e.g., the image plane 104), the imaging VBG 100, the one or more object planes 102 may be determined based on the selected range of wavelengths provided by the tunable light source 704, the periodicity of the imaging VBG 100 (e.g., the periodicity of the curved diffraction surfaces), and an orientation angle of the imaging VBG 100 as described throughout the present disclosure.

The tunable light source 704 may include any light source suitable for providing spectrally-tunable illumination. In some embodiments, the tunable light source 704 is a spectrally-tunable narrowband light source such as, but not limited to, a laser source. In some embodiments, the tunable light source 704 is a broadband light source coupled with a narrowband tunable spectral filter. For example, the tunable light source 704 may include, but is not limited to, supercontinuum source, a white-light laser source, a light-emitting diode, or the like). In some embodiments, the tunable light source 704 includes multiple sub-sources that each provide illumination with a different wavelength or range of wavelengths.

The tunable light source 704 may generally provide illumination with any spectral bandwidth. It is noted that the conditions for Bragg diffraction in an imaging system 702 are typically narrow and on the order of a few nanometers (e.g., up to 20 nm), and depend on the particular characteristics of each grating. Wavelengths that fall outside the conditions for Bragg diffraction for any particular imaging VBG 100 at any particular angle may pass through the imaging VBG 100 undiffracted (e.g., as shown in FIG. 1A).

The detector 706 may include any type of sensor known in the art suitable for capturing images of one or more objects at one or more object planes 102 such as, but not limited to, a complementary metal-oxide-semiconductor (CMOS) sensor, a charge-coupled device (CCD), or a photodiode array.

In some embodiments, the imaging system 702 includes a controller 708 with one or more processors 710 configured to execute program instructions located on a memory 712 (e.g., a memory device). The one or more processors 710 of a controller 708 may include any processing element known in the art. In this sense, the one or more processors 710 may include any microprocessor-type device configured to execute algorithms and/or instructions such as, but not limited to, one or more central processing units (CPUs), one or more graphical processing units (GPUs), one or more digital signal processors (DSPs), one or more field-programmable gate arrays (FPGAs), or one or more application-specific integrated circuits (ASICs). Further, the memory 712 may include any storage medium known in the art suitable for storing program instructions executable by the associated one or more processors 710. For example, the memory 712 may include a non-transitory memory medium. As an additional example, the memory 712 may include, but is not limited to, a read-only memory, a random-access memory, a magnetic or optical memory device (e.g., disk), a magnetic tape, a solid-state drive and the like.

The program instructions may cause the processors 710 to implement any number of process steps. For example, the program instructions may cause the processors 710 to receive data from the detector 706 associated with the sequential imaging of the two or more of the object planes 102 in a sample onto different lateral locations of the detector 706, and generate a three-dimensional dataset associated with the sample based on the data from the detector 706. The three-dimensional dataset may have any form such as, but not limited to, a series of images associated with cross-sectional planes of the sample.

Figure 8:
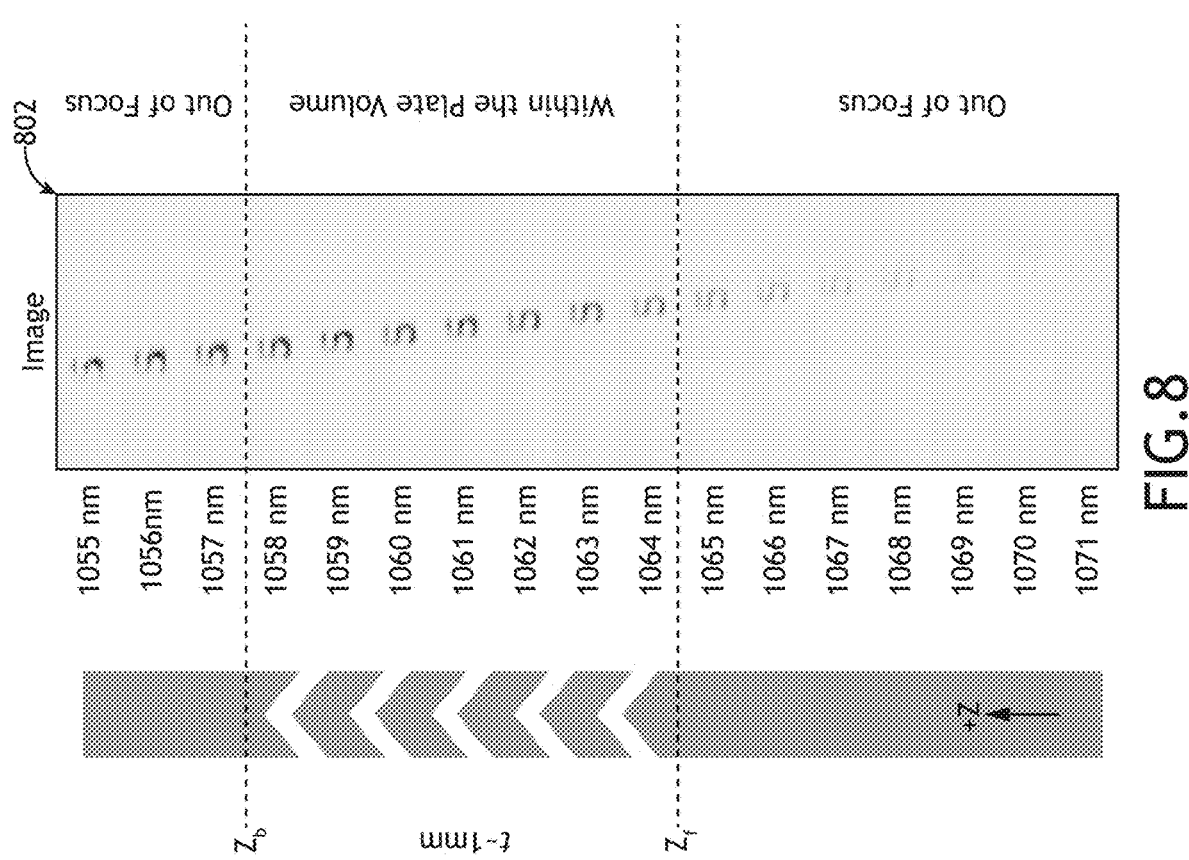
FIG. 8 includes a composite image formed from tuning the wavelength of the illumination from the tunable light source through the range of 1055-1071 nm in 1 nm increments.

Referring now to FIG. 8, FIG. 8 illustrates an experimental demonstration of imaging with an imaging system 702 incorporating an imaging VBG 100, in accordance with one or more embodiments of the present disclosure. In this experiment, a transmissive object including a number "5" formed as a transmissive region of a black target was imaged using a tunable light source 704 formed as a monochromatic wavelength-tunable source providing light in a spectral range from 1055-1071 nm. Further, the image plane 104 (e.g., the detector 706) and the object plane 102 (e.g., the transmissive object) were each placed two focal lengths from an imaging VBG 100 in the configuration shown in FIGS. 6A-6C.

FIG. 8 includes a composite image 802 formed from tuning the wavelength of the illumination from the tunable light source 704 through the range of 1055-1071 nm in 1 nm increments. In FIG. 8, $Z_b$ and $Z_f$ represent the back and front surfaces of the transmissive target, while t~1 mm represents the thickness of the transmissive target. As shown in FIG. 8, different depths of the transmissive target are sequentially imaged at different lateral locations of the image plane 104 and captured by the detector 706 based on different illumination wavelengths. It is noted that although this demonstration focuses on a transmissive object that is uniform throughout its thickness, it is to be understood that the systems and methods disclosed herein may be suitable for volumetric imaging of any suitable target.

Figure 9:
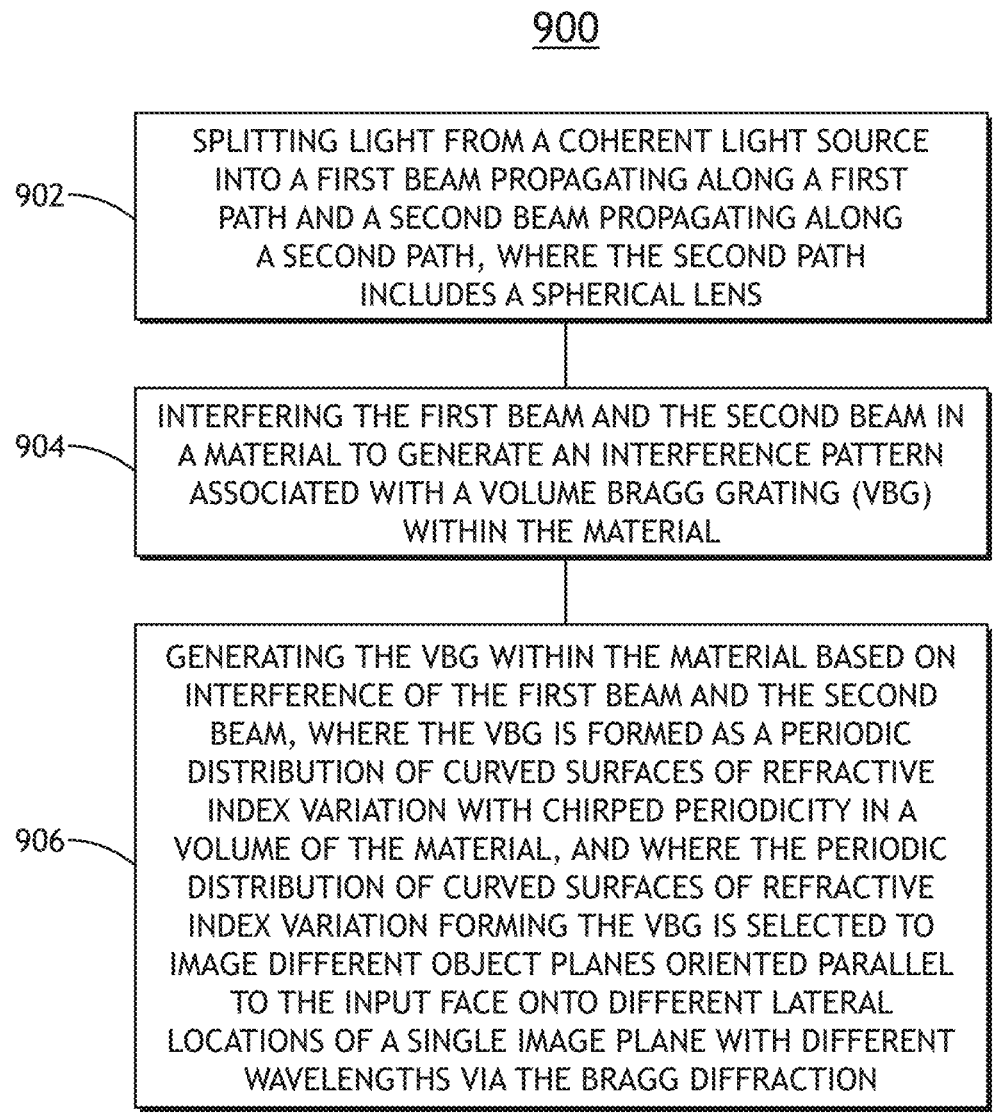
FIG. 9 illustrates a flow diagram depicting steps performed in a method for fabricating an imaging VBG, in accordance with one or more embodiments of the present disclosure.
Figure 10:
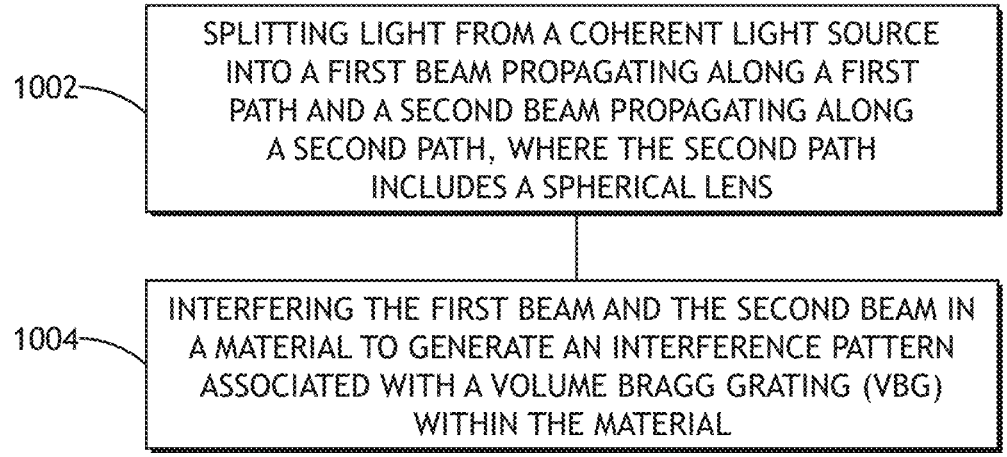
FIG. 10 illustrates a flow diagram depicting steps performed in a method for volumetric imaging with an imaging VBG, in accordance with one or more embodiments of the present disclosure.

Referring now to FIGS. 9-10, methods for fabricating and using an imaging VBG 100 are described, in accordance with one or more embodiments of the present disclosure.

FIG. 9 illustrates a flow diagram depicting steps performed in a method 900 for fabricating an imaging VBG 100, in accordance with one or more embodiments of the present disclosure. The method 900 may be, but is not required to be, implemented with the interferometer 302 depicted in FIG. 3.

In some embodiments, the method 900 includes a step 902 of splitting light from a coherent light source (e.g., input light 208) into a first beam propagating along a first path (e.g., signal light 210 propagating along a signal arm 212) and a second beam propagating along a second path (e.g., reference light 214 propagating along a reference arm 216, where the second path includes a spherical lens.

In some embodiments, the method 900 includes a step 904 of interfering the first beam and the second beam in a material (e.g., a photosensitive material 204) to generate an interference pattern associated with a VBG (e.g., an imaging VBG 100) within the material. The photosensitive material 204 may include any type of photosensitive material suitable for providing a VBG (e.g., an imaging VBG 100) in response to the interference in step 904 either directly upon exposure or upon subsequent steps (e.g., heating, or the like).

In some embodiments, the method 900 includes a step 904 of generating the VBG (e.g., the imaging VBG 100) within the material based on interference of the first beam and the second beam, where the VBG is formed as a periodic distribution of curved surfaces of refractive index variation with chirped periodicity (e.g., transverse chirp) in a volume of the material, and where the periodic distribution of curved surfaces of refractive index variation forming the VBG is selected to image different object planes oriented parallel to the input face onto different lateral locations of a single image plane with different wavelengths via the Bragg diffraction.

FIG. 10 illustrates a flow diagram depicting steps performed in a method 1000 for volumetric imaging with an imaging VBG 100, in accordance with one or more embodiments of the present disclosure. The method 1000 may be, but is not required to be, implemented with the imaging system 702 depicted in FIG. 7. Further, the method 1000 may be schematically depicted in FIGS. 6A-6C.

In some embodiments, the method 1000 includes a step 1002 of aligning a detector (e.g., a detector 706) with VBG (e.g., an imaging VBG 100) for imaging of a sample. For example, the VBG is formed as a periodic distribution of curved surfaces of refractive index variation with chirped periodicity in a volume of a material, where the periodic distribution of curved surfaces of refractive index variation forming the VBG is selected to image different object planes in the sample oriented parallel to an input face of the material onto different lateral locations of a single image plane with different wavelengths via the Bragg diffraction. Further, the detector may be located at the single image plane.

In some embodiments, the method 1000 includes a step 1004 of sequentially illuminating the sample with two or more wavelength values to sequentially image two or more of the object planes in the sample onto different lateral locations of the detector.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An imaging element comprising:
   a volume Bragg grating (VBG) within a material, wherein the material has an input face, wherein the VBG is formed as a periodic distribution of curved surfaces of refractive index variation with chirped periodicity in a volume of the material, wherein the periodic distribution of curved surfaces of refractive index variation forming the VBG is selected to image different object planes oriented parallel to the input face onto different lateral locations of a single image plane with different wavelengths via Bragg diffraction.

2. The imaging element of claim 1, wherein the chirped periodicity comprises:
   transverse chirp.

3. The imaging element of claim 1, wherein the material comprises:
   at least one of a glass, a crystal, a polymer, or a sol-gel.

4. The imaging element of claim 1, wherein the VBG provides a dioptric power with an optical axis tilted with respect to the input face.

5. The imaging element of claim 1, wherein the VBG is a transmissive VBG.

6. The imaging element of claim 1, wherein the VBG is a reflective VBG.

7. An imaging system comprising:
   a tunable light source configured to illuminate a sample with illumination, wherein a wavelength of the illumination is tunable;
   a volume Bragg grating (VBG) within a material, wherein the material has an input face, wherein the VBG is formed as a periodic distribution of curved surfaces of refractive index variation with chirped periodicity in a volume of the material, wherein the periodic distribution of curved surfaces of refractive index variation forming the VBG is selected to image different object planes oriented parallel to the input face onto different lateral locations of an image plane with different wavelengths via Bragg diffraction; and
   a detector located at the image plane;
   wherein the tunable light source is configured to sequentially provide two or more values of the wavelength to sequentially image two or more of the object planes in the sample onto the different lateral locations of the detector.

8. The imaging system of claim 7, further comprising:
   a controller including one or more processors configured to execute program instructions causing the one or more processors to:
   receive data from the detector associated with the sequential imaging of two or more of the object planes in the sample onto the different lateral locations of the detector; and
   generate a three-dimensional dataset associated with the sample based on the data from the detector.

9. The imaging system of claim 8, wherein the three-dimensional dataset comprises:
   two or more images.

10. The imaging system of claim 7, wherein the chirped periodicity comprises:
    transverse chirp.

11. The imaging system of claim 7, wherein the material comprises:
    at least one of a glass, a crystal, a polymer, or a sol-gel.

12. The imaging system of claim 7, wherein the VBG provides a dioptric power with an optical axis tilted with respect to the input face.

13. The imaging system of claim 7, wherein the tunable light source provides narrowband source light as the illumination, wherein the wavelength of the narrowband source light is tunable.

14. The imaging system of claim 7, wherein the tunable light source provides broadband source light, wherein the imaging system further comprises a tunable narrowband spectral filter, wherein the illumination is formed from a portion of the broadband source light filtered by the tunable narrowband spectral filter.

15. The imaging system of claim 7, wherein the VBG is a transmissive VBG.

16. The imaging system of claim 7, wherein the VBG is a reflective VBG.

17. A method for fabricating an imaging element, comprising:
    splitting light from a coherent light source into a first beam propagating along a first path and a second beam propagating along a second path, wherein the second path includes a spherical lens;
    interfering the first beam and the second beam in a material to generate an interference pattern associated with a volume Bragg grating (VBG) within the material; and
    generating the VBG within the material based on interference of the first beam and the second beam, wherein the VBG is formed as a periodic distribution of curved surfaces of refractive index variation with chirped periodicity in a volume of the material, wherein the periodic distribution of curved surfaces of refractive index variation forming the VBG is selected to image different object planes oriented parallel to an input face of the material onto different lateral locations of a single image plane with different wavelengths via Bragg diffraction.

18. The method of claim 17, wherein the material is a photosensitive material, wherein generating the volume Bragg grating (VBG) within the material based on interference of the first beam and the second beam comprises:
    interfering the first beam and the second beam in the material to induce the periodic distribution of curved surfaces of refractive index variation with chirped periodicity in the volume of the material.

19. The method of claim 17, wherein the material is a photosensitive material, wherein generating the volume Bragg grating (VBG) within the material based on interference of the first beam and the second beam comprises:
interfering the first beam and the second beam in the material to induce a chemical change in the material; and
heating the material to induce the periodic distribution of curved surfaces of refractive index variation with chirped periodicity in the volume of the material.

20. The method of claim 17, wherein the chirped periodicity comprises:
transverse chirp.

21. The method of claim 17, wherein the material comprises:
at least one of a glass, a crystal, a polymer, or a sol-gel.

22. The method of claim 17, wherein the VBG provides a dioptric power with an optical axis tilted with respect to the input face.

23. The method of claim 17, wherein the VBG is a transmissive VBG.

24. The method of claim 17, wherein the VBG is a reflective VBG.

25. A method for volumetric imaging, comprising:
aligning a detector with volumetric Bragg grating (VBG) for imaging of a sample, wherein the VBG is formed as a periodic distribution of curved surfaces of refractive index variation with chirped periodicity in a volume of a material, wherein the periodic distribution of curved surfaces of refractive index variation forming the VBG is selected to image different object planes in the sample oriented parallel to an input face of the material onto different lateral locations of a single image plane with different wavelengths via Bragg diffraction, wherein the detector is located at the single image plane; and
sequentially illuminating the sample with two or more wavelength values to sequentially image two or more of the object planes in the sample onto the different lateral locations of the detector.

26. The method of claim 25, further comprising:
receiving data from the detector associated with the sequential imaging of the two or more of the object planes in the sample onto the different lateral locations of the detector; and
generating a three-dimensional dataset associated with the sample based on the data from the detector.

27. The method of claim 26, wherein the three-dimensional dataset comprises:
two or more images.

28. The method of claim 25, wherein the chirped periodicity comprises:
transverse chirp.

29. The method of claim 25, wherein the VBG provides a dioptric power with an optical axis tilted with respect to the input face.

30. The method of claim 25, wherein the VBG is a transmissive VBG.

31. The method of claim 25, wherein the VBG is a reflective VBG.

* * * * *